United States Patent [19]
Mizuno et al.

[11] 4,456,813
[45] Jun. 26, 1984

[54] HOT WIRE TYPE ARC WELDING SYSTEM

[75] Inventors: Masanori Mizuno; Yoshiaki Kato; Takaji Mizuno, all of Aichi, Japan

[73] Assignee: Mitsubishi Denki Kabushiki Kaisha, Tokyo, Japan

[21] Appl. No.: 454,528

[22] Filed: Dec. 30, 1982

[30] Foreign Application Priority Data

Jan. 8, 1982 [JP] Japan .................................... 57-1580

[51] Int. Cl.³ .............................................. B23K 9/10
[52] U.S. Cl. .......................... 219/130.21; 219/137 PS
[58] Field of Search ...................... 219/130.51, 130.21, 219/130.31, 130.32, 130.33, 137 PS, 137.71

[56] References Cited

FOREIGN PATENT DOCUMENTS 55-97877 7/1980 Japan ............................... 219/130.31

Primary Examiner—C. C. Shaw
Attorney, Agent, or Firm—Sughrue, Mion, Zinn, Macpeak & Seas

[57] ABSTRACT

In a welding apparatus employing a switching element between a power source and a filler wire, a protection circuit operates to discontinue the function of the switching element when a short-circuit is detected between, for example, the filler wire and a welding electrode, so that the switching element is protected from damage due to an overcurrent.

11 Claims, 5 Drawing Figures

HOT WIRE TYPE ARC WELDING SYSTEM

BACKGROUND OF THE INVENTION

This invention relates to hot wire type arc welding systems, and more particularly to a protecting circuit for switching elements of a DC TIG welding source, which are provided for heating a filler wire at a constant voltage.

A system of this type is as shown in FIG. 1. In FIG. 1, reference numeral 1 designates a DC voltage source; 2 and 3, first and second switching elements connected to the positive terminal of the voltage source 1, which are preferably parallel-connected transistors; 4, a first DC reactor connected to the output of the first switching element; 5, a second DC reactor connected to the output of the second switching element 3, 6, a first power source output terminal connected to the output of the first DC reactor; 7, a second power source output terminal connected to the output of the second DC reactor 5; 8, a current detector connected to the negative terminal of the DC voltage source 1; 9, a third power source output terminal connected to the output of the current detector 8; and 10, a control circuit for receiving signals from the first power source output terminal 6, the second power source output terminal 7 and the current detector 8, to apply drive signals to the first and second switching elements 2 and 3. Further in FIG. 1, reference numeral 11 designates a current supplying tip connected to the first power source output terminal 6; and 12 is a filler wire fed through the current supplying tip by a feeding unit (not shown). A workpiece 13 is coupled to a second power source output terminal 7; and a welding torch 14 is connected to the third power source output terminal. A torch electrode 15 is connected to the end of the welding torch 14.

The operation of the system thus organized will now be described.

When welding starts, i.e., when arcs are generated between the torch electrode 15 of the welding torch 14 and the workpiece 13 and the filler wire 12 is fed towards the workpiece 13 to cause the short-circuiting therebetween, current flows from the DC voltage source 1 through the first switching element 2, the current supplying tip 11, the filler wire 12, the workpiece 13 and the torch electrode 15 of the welding torch 14, that is, heating current $I_1$ flows in the filler wire 12. In this operation, an instruction signal is applied to the first switching element 2 so that the voltage at the heated part of the filler wire 12, which is fed back to the control circuit 10 through the first power source output terminal 6, is maintained constant. As a result, the first switching element 2 is repeatedly turned on and off. The heating voltage to the filler wire 12 is smoothed by the first DC reactor 4 into a substantially pure DC voltage, thus being maintained constant. On the other hand, welding current $I_2$ flows through the second switching element 3, the second DC reactor 5, the second power source output terminal 7, the workpiece 13, the torch electrode 15 and the first power source output terminal 9. Accordingly, the actual welding current is the sum of the heating current $I_1$ of the filler wire 12 and the above-described welding current $I_2$; that is, welding current $(I_1+I_2)$ flows through the current detector 8. The welding current $(I_1+I_2)$, being detected by the current detector 8, is applied to the control circuit 10. The control circuit 10 applies an instruction signal to the second switching element 3 so that the welding current $(I_1+I_2)$ is maintained constant. As a result, the second switching element 3 is repeatedly turned on and off. In this operation, the actual welding current $(I_1+I_2)$ flowing in the welding arc is smoothed by the second DC reactor 5 into a substantially pure direct current, thus being maintained constant. While the workpiece 13 is made molten by the heat of the arcs generated between the torch electrode 15 and the workpiece 13, the filler wire 12 is fed onto the workpiece while being heated, so that the filler wire 12 is readily melted into the workpiece, i.e., welding is readily achieved. Even, in this connection, if the hand is shaken or the configuration of the workpiece 13 is changed more or less to vary the length of the heated part of the filler wire 12, the filler wire 12 is never heated excessively or insufficiently, i.e., welding is carried out stably, because the heating voltage is maintained constant as described above.

The conventional DC TIG welding power source is designed as described above. Accordingly, when a short occurs between the current supplying tip 11 and the torch electrode 15, or the filler wire, being short in dimension, is short-circuited with the torch electrode 15, a considerably large short-circuit current flows because the heating voltage of the filler wire is stabilized as described above. The short-circuit current may damage the first switching element 2, by exceeding the rating of the latter.

SUMMARY OF THE INVENTION

Accordingly, an object of this invention is to eliminate the above-described difficulties accompanying a conventional hot wire type arc welding system.

More specifically, an object of this invention is to provide a hot wire type arc welding system in which the voltage between the filler wire and the torch electrode is detected, so that when this voltage is lower than a predetermined value, the operation of the first switching element is suspended, or such that when the arc current comes to a predetermined value, the operation of the first switching element is stopped, so that the first switching element is protected from damage.

The foregoing object and other objects of the invention have been achieved by the provision of a hot wire type arc welding system which, according to the invention, includes a non-consumable electrode; a filler wire fed to a molten pool which is formed by arcs between the non-consumable electrode and a base metal; wire feeding means for feeding the wire to the molten pool; a first switching element connected between the wire and a DC source, the first switching element being adapted to make the wire heating voltage constant; a second switching element for controlling the welding current to a predetermined value, the welding current being the sum of an arc forming current for forming arcs between the non-consumable electrode and the base metal, and the wire heating current; wire heating voltage controlling means for detecting a wire heating voltage and for controlling the on-off operation of the first switching element so that the wire heating voltage thus detected has a constant voltage characteristic; a current detector for detecting the welding current; arc current controlling means for controlling the on-off operation of the second switching element so that the detection current of the current detector has a constant current characteristic; short-circuit detecting means for detecting a short-circuit between the non-consumable electrode and the filler wire; and a protecting circuit for controlling the wire heating voltage controlling means in response to a detection signal from the short-circuit detecting means, to stop the function of the first switching element.

The nature, principle and utility of the invention will become more apparent from the following detailed description and the appended claims when read in conjunction with the accompanying drawings.

DETAILED DESCRIPTION OF THE PREFERRED EMBODIMENTS

Figure 1:
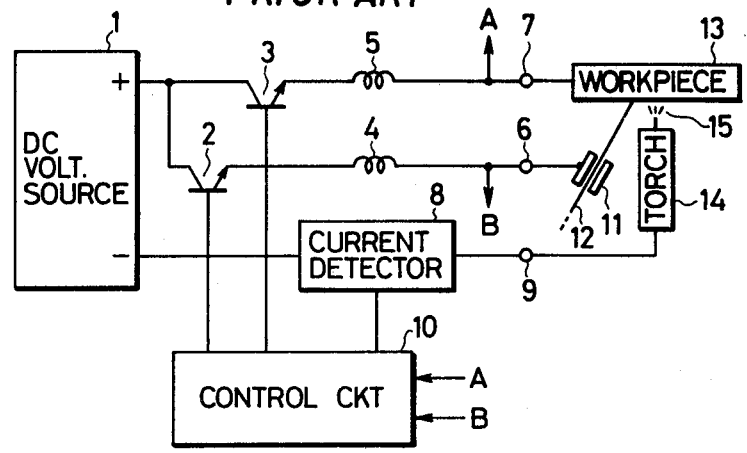
FIG. 1 is a circuit diagram, partly as a block diagram, showing a conventional DC TIG welding power source.
Figure 2:
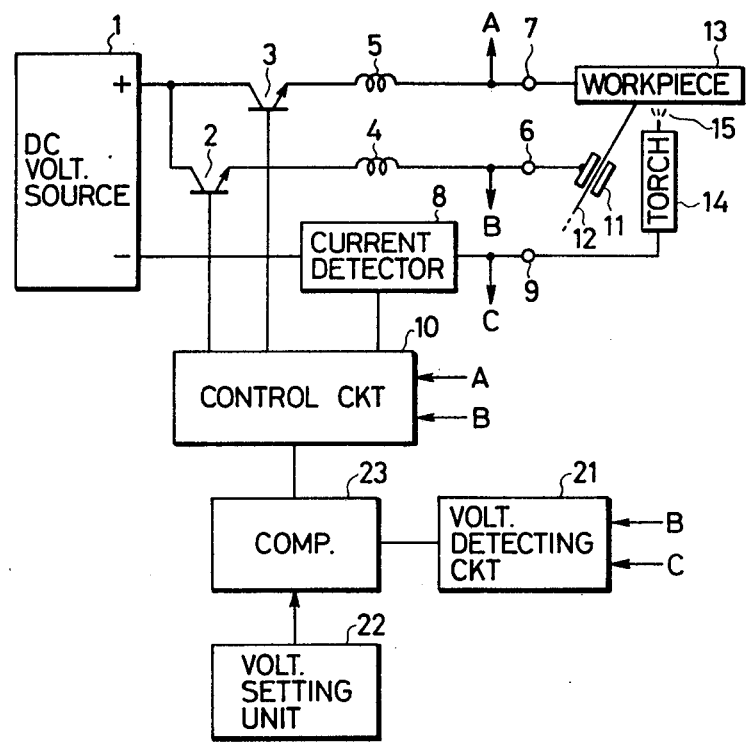
FIG. 2 is a circuit diagram, partly as a block diagram, showing a first example of a welding power source protecting circuit according to this invention.

A first example of a hot wire type arc welding system according to this invention, as shown in FIG. 2, includes components 1 through 15 which are identical to those similarly numbered in FIG. 1; a voltage detecting circuit 21 which receives signals from the first and third power source output terminals 6 and 9; an adjustable voltage setting unit 22; and a voltage comparator 23 to which the outputs of the voltage detecting circuit 21 and the voltage setting unit 22 are applied, the output of the comparator 23 being supplied to the control circuit 10.

The operation of the arc welding system in FIG. 2 is as follows: When a welding operation beings, i.e., when arcs are produced between the torch electrode 15 of the welding torch 14 and the workpiece 13, and the filler wire 12 is fed towards the workpiece 13, to cause short-circuiting therebetween, current from the DC voltage source flows through the first switching element 2, the current supplying tip 11, the filler wire 12, the workpiece 13 and the torch electrode 15 of the welding torch 14; that is, a heating current $I_1$ flows in the filler wire. In this operation, an instruction signal is applied to the first switching element 2 so that the voltage of the heated part of the filler wire 12, being fed back through the first power source output terminal 6 to the control circuit 10, is maintained constant. As a result, the first switching element 2 is repeatedly turned on and off. The heating voltage to the filler wire 12 is smoothed by the first DC reactor 4 into a substantially pure DC voltage, thus being maintained constant. On the other hand, welding current $I_2$ flows through the second switching element 3, the second DC reactor 5, the second power source output terminal 7, the workpiece 13, the torch electrode 15 and the third power source output terminal 9. Accordingly, the actual welding current is the sum of the heating current $I_1$ of the filler wire 12 and the above-described welding current $I_2$; that is, welding current $(I_1+I_2)$ flows through the current detector 8. The welding current $(I_1+I_2)$, being detected by the current detector 8, is applied to the control circuit 10. The latter applies an instruction signal to the second switching element 3 so that the welding current $(I_1+I_2)$ is maintained constant. As a result, the second switching element 3 is repeatedly turned on and off. In this operation, the actual welding current $(I_1+I_2)$ flowing through the arc is smoothed by the second DC reactor 5 into a substantially pure direct current, thus being maintained constant. While the workpiece 13 is made molten by the heat of the arcs produced between the torch electrode 15 and the workpiece 13, the filler wire 12 is fed onto the workpiece while being heated, so that the filler wire 12 is readily melted into the workpiece, i.e., welding is smoothly carried out.

When a short-circuit occurs between the current supplying tip 11 and the torch electrode 15, or when the filler wire 12, being short in dimension, is short-circuited with the torch electrode 15, the voltage between the first and third power source output terminals 6 and 9 is abruptly decreased. This voltage is applied to the voltage detecting circuit 21 where it is subjected to voltage conversion in a predetermined ratio. The output of the voltage detecting circuit 21 is supplied to the voltage comparator 23, to which a set value from the voltage setting unit 22 is applied. When the output of the voltage comparator 23 becomes lower than the set value, the latter 23 applies an instruction signal to the control circuit 10, so that operation of the first switching element 2 is suspended. If, in this case, the set value of the voltage setting unit 22 is suitably selected, then when the current applying tip 11 is shorted with the torch electrode 15, or the filler wire 12 is short-circuited with the torch electrode 15, the function of the first switching element 2 can be stopped before an over-current flows therein; that is, the switching element 2 can be protected against damage.

Figure 4:
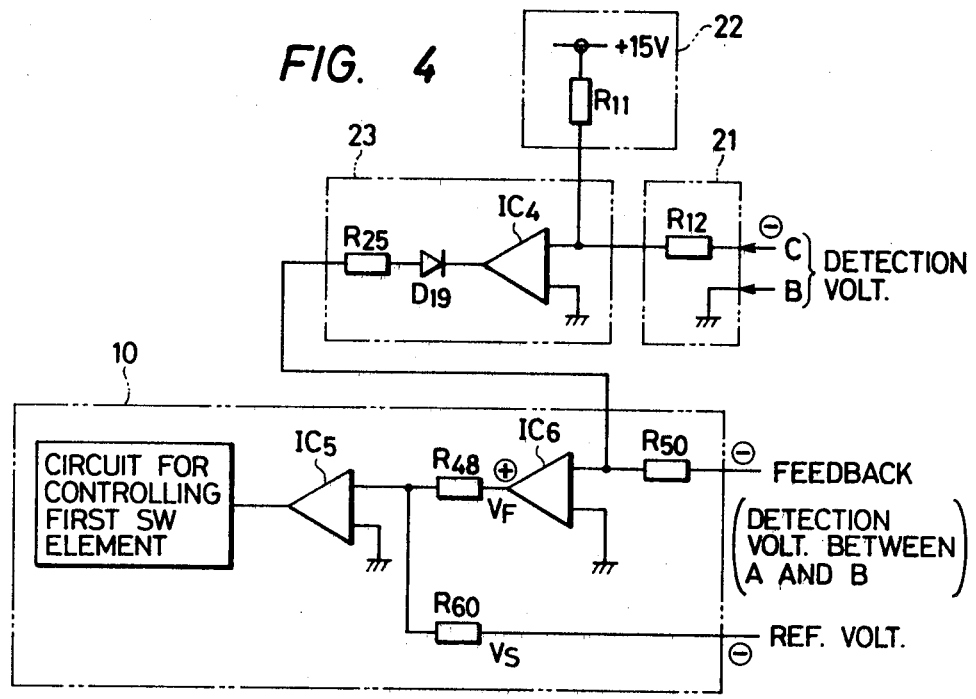
FIG. 4 is a circuit diagram, partly as a block diagram, showing typical examples of a voltage detecting circuit, a voltage setting unit and a voltage comparator in FIG. 2.

Typical examples of the circuits, 10, 21, 22 and 23 are as shown in FIG. 4.

In FIG. 4, reference character $IC_5$ designates a comparator in which a detection voltage $V_F$ is compared with a reference voltage $V_S$. When $V_S > V_F$, the comparator $IC_5$ outputs a signal for turning on the first switching element 2. When $V_S < V_F$, the comparator $IC_5$ provides a signal for turning off the first switching element 2. The detection signal $V_F$ is a detection voltage between the circuit points A and B which is inverted and amplified by an amplifier $IC_6$.

The voltage detecting circuit 21 is connected through a resistor $R_{12}$ to a voltage comparator $IC_4$. In the voltage setting unit 22, a supply voltage $+15$ V is applied through a resistor $R_{11}$ to the voltage comparator $IC_4$. During normal operation, the detection voltage (between the circuit points B and C) is larger than the set voltage, and therefore the voltage comparator $IC_4$ outputs a positive voltage. Accordingly, the diode $D_{19}$ is cut off, so that the positive voltage is not applied to the amplifier $IC_6$. In this case, only the detection voltage between the circuit points A and B is applied to the amplifier $IC_6$, and thus the operation proceeds normally.

When the electrode is short-circuited with the wire, i.e., when the detection voltage between the circuit points B and C becomes smaller than the set voltage, the voltage comparator $IC_4$ outputs a negative voltage. This voltage is applied through the diode $D_{19}$ and the resistor $R_{25}$ to the amplifier $IC_6$. As a result, the relation $V_F < V_S$ is satisfied, and the first switching element is placed on the "off" state.

The set voltage of the voltage comparator $IC_4$ can be determined as desired by selecting the values of the supply voltage (which is +15 V in the example) and the resistors $R_{11}$ and $R_{12}$. For instance, if the values of the resistors $R_{11}$ and $R_{12}$ are set to 18 KΩ and 4.7 KΩ, respectively, the first switching element is turned off when $V_{CB}$ is lower than 3.9 V.

Figure 3:
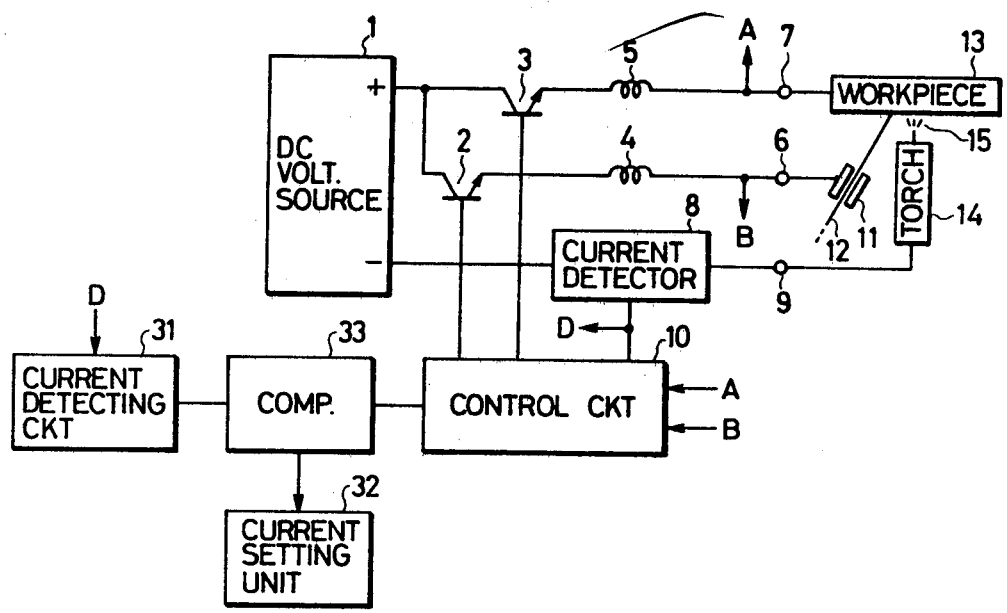
FIG. 3 is a circuit diagram, partly as a block diagram, showing a second example of the welding power source protecting circuit according to the invention.

A second example of the hot wire type arc welding system according to the invention is as shown in FIG. 3.

In FIG. 3, reference numerals 1 through 15 denote parts similar to those correspondingly numbered in FIG. 1; and 31 is a current detecting circuit to which the output of the current detector 8 is applied; 32, an adjustable current setting unit; and 33, a current comparator to which the outputs of the current detecting circuit 31 and the current setting unit 32 are applied. The output of the current comparator 33 is applied to the control circuit 10.

Similarly as in the case of the first example in FIG. 2, when a short is caused between the current supplying tip 11 and the torch electrode 15, or when the filler wire 12 is short-circuited with the torch electrode 15, an excessively large current, which is larger than the constant current value controlled by the second switching element 3, tends to flows in the arcing part. In this case, an excessively large current tends to flow through the first switching element 2. This current is detected by the current detector 8 and is then subjected to voltage conversion by the current detecting circuit 31, the output of which is applied to the current comparator 33. If, in this case, the set value of the current setting unit 32 is suitably selected, the current comparator 33 does not respond to the constant welding current $(I_1+I_2)$ controlled by the second switching element, but will responsive to an excessively large current which is larger by a certain amount than $(I_1+I_2)$, so as to stop the function of the first switching element. Thus, similarly, the first switching element is protected from damage.

Figure 5:
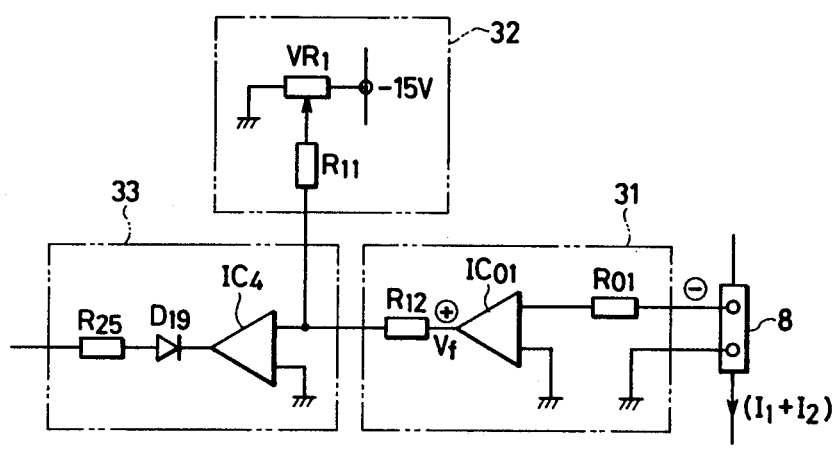
FIG. 5 is a circuit diagram, partly as a block diagram, showing typical examples of a current detecting circuit, a current setting unit and a current comparator of FIG. 3.

Typical examples of the circuits 31, 32 and 33 are as shown in FIG. 5. The small signal of the current detector 8 is applied through a resistor $R_{01}$ to an inversion amplifier $IC_{01}$, where it is amplified to the same level as the set voltage. In normal operation, the set voltage (the power source being of a negative voltage) is larger than the detection voltage $F_f$, and therefore an amplifier $IC_4$ outputs a positive voltage, and the other operations are similar to those described above.

When the filler wire is short-circuited with the electrode to increase the welding current $(I_1-I_2)$, the set voltage becomes smaller than the detection voltage $V_f$ and the amplifier $IC_4$ outputs a negative voltage. Thus, similarly, as in the above-described case, the first swtiching element 2 is turned off. In FIG. 5, reference character $VR_1$ designates a unit for setting the arc current $(I_1+I_2)$. The signal voltage is commonly used as the set voltage of the comparison circuit. If, similarly to the case of FIG. 4, the values of the resistors $R_{11}$ and $R_{12}$ are set to 18 KΩ and 4.7 KΩ, respectively, and the output of the amplifier $IC_{01}$ is set to 3.9 V while the value of the resistor $R_{01}$ is set to 1 KΩ, then the first switching element is turned off when $(I_1+I_2)$ becomes higher than 300 A.

As is apparent from the above description, the function of the switching element used in the filler wire heating power source section, which is voltage-stabilized, is halted by detecting an abrupt change in the output current, whereby the switching element is protected from damage.

What is claimed is:

1. A hot wire type arc welding system, comprising;
   an electrode;
   a filler wire fed between said electrode and a base metal,
   a first switching element connected between said wire and a DC source, said first switching element being adapted to control a wire heating voltage,
   a second switching element for controlling a welding current,
   wire heating voltage control means for detecting a wire heating voltage and controlling the on-off operation of said first switching element,
   a current detector for detecting said welding current,
   arc current control means for controlling the on-off operation of said second switching element,
   short-circuit detecting means for detecting a short-circuit between said electrode and said wire, and
   a protecting circuit for controlling said wire heating voltage control means in response to a detection signal from said short-circuit detecting means, to halt the wire heating voltage control function of said first switching element.

2. A system as claimed in claim 1, in which said short-circuit detecting means comprises a voltage detecting circuit for detecting a voltage between said electrode and said filler wire; a voltage setting unit for setting a voltage comprising a reference voltage with respect to a detection voltage provided by said voltage detecting circuit; and a voltage comparator for comparing said detection voltage of said voltage detecting circuit with said reference voltage provided by said voltage setting unit.

3. A system as claimed in claim 2, in which said protecting circuit comprises means for applying a control signal to said wire heating voltage control means when said detection voltage of said voltage detecting circuit becomes lower than said reference voltage of said voltage setting unit.

4. A system as claimed in claim 3, in which said heating voltage control means comprises a voltage detector for detecting a voltage between said filler wire and said base metal; and a comparison circuit for comparing a detection voltage of said voltage detector with a set voltage, to output a signal for controlling the on-off operation of said first switching element.

5. A system as claimed in claim 4, wherein a control signal from said protecting circuit is applied to said comparison circuit in precedence over a detection voltage signal from said voltage detector, to maintain said first switching element turned off.

6. A system as claimed in claim 5, wherein said first switching element comprises transistor means.

7. A system as claimed in claim 6, wherein said electrode is a non-consumable tungsten electrode.

8. A system as claimed in claim 1, wherein said short-circuit detecting means comprises a current setting unit for setting a current comprising a reference current with respect to a detection current from said current detector; and a current comparator for comparing a detection current of said current detector with said reference current of said current setting unit.

9. A system as claimed in claim 8, wherein said protecting circuit comprises means for applying a control signal to said wire heating current control means when said detection current of said current detecting circuit becomes larger than said reference current of said current setting unit.

10. A system as claimed in claim 9, wherein said wire heating voltage controlling means comprises a voltage detector for detecting a voltage between said wire and said base metal; and a comparison circuit for comparing a detection voltage of said voltage detector with a set voltage, to output a signal for controlling the on-off operation of said first switching element.

11. A system as claimed in claim 10, wherein a control signal from said protecting circuit is applied to said comparison circuit in precedence over a detection signal from said voltage detector, to maintain said first switching element turned off.

* * * * *